United States Patent [19]

Fry et al.

[11] Patent Number: 5,068,618

[45] Date of Patent: * Nov. 26, 1991

[54] APPARATUS FOR MEASURING DIFFERENTIAL IMPEDANCES

[75] Inventors: John J. Fry, Wickliffe; Robert A. Smith, Mentor, both of Ohio

[73] Assignee: Elsag International B.V.

[*] Notice: The portion of the term of this patent subsequent to Jun. 6, 2006 has been disclaimed.

[21] Appl. No.: 568,660

[22] Filed: Aug. 15, 1990

Related U.S. Application Data

[63] Continuation of Ser. No. 307,014, Feb. 6, 1989, abandoned, which is a continuation of Ser. No. 93,432, Sep. 4, 1987, Pat. No. 4,837,501.

[51] Int. Cl.$^5$ ............................................. G01R 27/08
[52] U.S. Cl. ..................................... 324/706; 324/705
[58] Field of Search ............................... 324/704–706, 324/713, 721, 725, 439, 442, 443, 140 D; 364/482

[56] References Cited

U.S. PATENT DOCUMENTS 4,837,501 6/1989 Fry et al. ............................ 324/706

OTHER PUBLICATIONS

Pogson; "Circuit & Design Ideas;" Electronics Australia, vol. 42, No. 3; Jun. 1980, p. 72.
IC Master 12-1980; United Technical Publications; pp. 402-403.

Primary Examiner—Jack B. Harvey
Attorney, Agent, or Firm—Vytas R. Matas; Robert J. Edwards

[57] ABSTRACT

An apparatus for measuring differential impedances which incorporates a CMOS timer in place of the sine wave generator in a typical AC bridge configuration. A toroidal signal transformer having its primary and secondary windings tightly twisted together and wound around the core lessens temperature drift characteristics. The differential bipolar current signal provided by the secondary winding is passed through an AC to DC converter which is switched by a field effect transistor, thereby eliminating the need for prior art inverter comparator circuits. Finally, by use of a bandpass filter after the signal transformer and by insertion of a capacitor before the AC to DC converter, the need for the active filter stage used in the prior art is eliminated.

4 Claims, 2 Drawing Sheets 025F 5,068,618

APPARATUS FOR MEASURING DIFFERENTIAL IMPEDANCES

This is a continuation of application Ser. No. 07/307,014, filed Feb. 6, 1989, now abandoned, which is a continuation of Ser. No. 07/093,432, Filed Sept. 4, 1987, now U.S. Pat. No. 4,837,501, granted June 6, 1989.

TECHNICAL FIELD

The present invention relates to apparatus for measuring differential impedances and more particularly to differential impedance measuring apparatus which is not effected by temperature changes and which requires a minimum of electrical componentry.

BACKGROUND ART

Two basic methods of measuring differential impedances between two sensor elements are presently in use. The first method utilizes a DC bridge configuration with either an instrumentation amplifier or a gain amplifier stage followed by a bias stage type of amplifier. Even though amplifier technology has improved significantly, temperature drift is a problem with either of the foregoing circuit configurations. The signal level of the differential sensor is low enough that significant shifts with temperature occur. Temperature compensation is possible, but requires significantly more manufacturing and testing time which increases overall cost. In addition, such temperature compensation requires more electronic components in the analog portion of the circuitry and more memory capacity in the digital portion of the circuitry.

The second method of measuring differential impedances between two sensor elements utilizes an AC bridge configuration and requires a sine wave generator circuit to provide an input to the common leg between the sensor elements. The active and reference legs of the sensor elements are connected to the primary side of a signal transformer having a center tap connected to common. The difference between the current in the active leg minus the current in the reference leg is present at the secondary winding of the transformer. This differential signal is then amplified through a two-stage active low pass filter and then rectified by an AC to DC converter. An inverter comparator circuit is necessary to phase the AC to DC converter stage. In addition, an active low pass filter is required to further filter the ripple existing in the signal as it exits from the AC to DC converter. This second method of measuring differential impedances improves the temperature characteristics of the resulting circuitry but requires additional electronic components in the form of an inverter comparator circuit and an active low pass filter. These additional circuit components significantly increase the overall costs of the resulting circuitry.

Because of the foregoing limitations with respect to the prior art approaches for measuring differential impedances, it has become desirable to develop circuitry for measuring differential impedances that is not effected by temperature changes and requires a minimum number of circuit components.

SUMMARY OF THE INVENTION

The present invention solves the problems associated with the prior art and other problems by replacing the sine wave generator in the foregoing AC bridge configuration with a CMOS timer. The unipolar square wave produced by the CMOS timer is applied to the common leg between the active and reference sensor elements which are connected to the primary side of a toroidal signal transformer having its center tap connected to common. The primary and secondary windings of the signal transformer are tightly twisted together and all of the windings are wound around the core. This process improves the temperature characteristics of the circuitry. The secondary winding of the transformer produces a differential bipolar current signal, which is representative of the difference between the active sensor and the reference sensor, and this current signal passes through a bandpass filter and is amplified and converted back to a bipolar AC voltage. This signal then passes through an AC to DC converter. This converter is switched by a field effect transistor which eliminates the need for an inverter comparator circuit as used in the prior art. The resulting signal finally passes through a low pass filter to further remove ripple. By utilizing a bandpass filter after the signal transformer and by adding a capacitor before the AC to DC converter, the active filter stage required in the prior art is eliminated. Thus, the foregoing circuitry achieves better temperature performance than the prior art and eliminates the need for several costly electronic components.

DESCRIPTION OF THE PREFERRED EMBODIMENT

Figure 1:
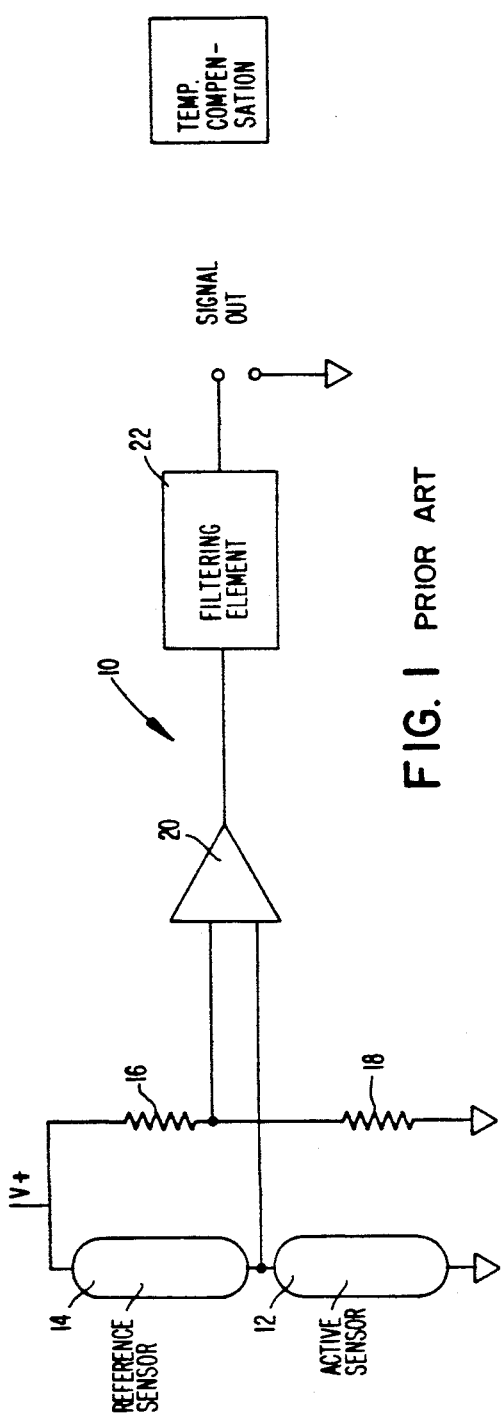
FIG. 1 is a schematic diagram of a prior art differential impedance measuring circuit utilizing a DC bridge configuration.
Figure 2:
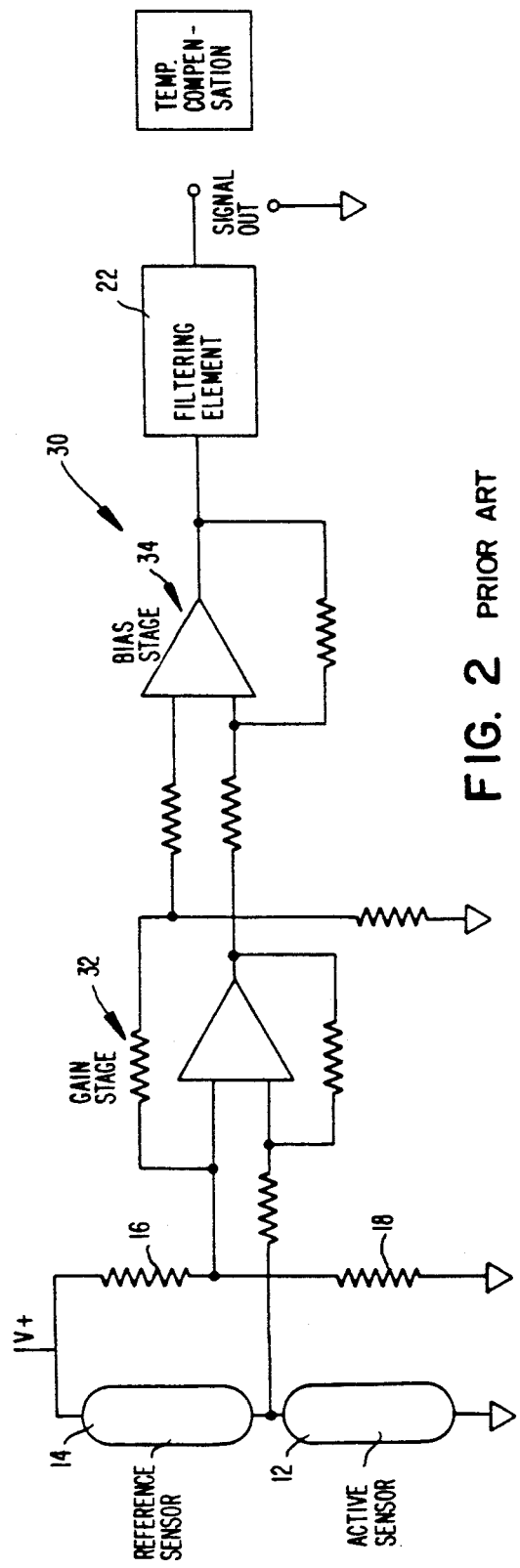
FIG. 2 is a schematic diagram of another prior art differential impedance measuring circuit utilizing a DC bridge configuration.

Referring not to the drawing where the illustrations are for the purpose of describing the preferred embodiment of the present invention and are not intended to limit the invention hereto, FIG. 1 is a schematic diagram of a differential impedance measuring circuit 10 of the prior art. As such, this circuit 10 includes an active sensor element 12, a reference sensor element 14, and reference resistors 16 and 18 connected in a DC bridge configuration. An instrumentation amplififer 20 is connected to the common leg between the sensor elements 12 and 14 and to the common leg between the reference resistors 16 and 18. The output of the instrumentation amplifier 20 is connected to a filter element 22 in order to reduce the ripple in the output signal produced the amplifier 20. Referring not to FIG. 2 which illustrates another impedance measuring circuit 30 of the prior art utilizing a DC bridge configuration, those elements which are similar to those in FIG. 1 carry the same reference numeral. This circuit 30 differs from the circuit 10 shown in FIG. 1 in that the instrumentation amplifier 20 in FIG. 1 is replaced by a gain stage amplifier, shown generally by the numeral 32, and a bias stage amplifier, shown generally by the numeral 34. In all other respects, the circuits 10 and 30 shown in FIGS. 1 and 2 respectively, are identical and have similar operating characteristics and deficiencies. For example, even though operating amplifier technology has improved significantly, temperature drift is still a problem with both of these circuits and operating results differ significantly as temperature changes. Temperature compensation techniques can be utilized with each of these circuits, however, such techniques require additional electronic circuitry which significantly increases overall manufacturing costs and testing time.

Figure 3:
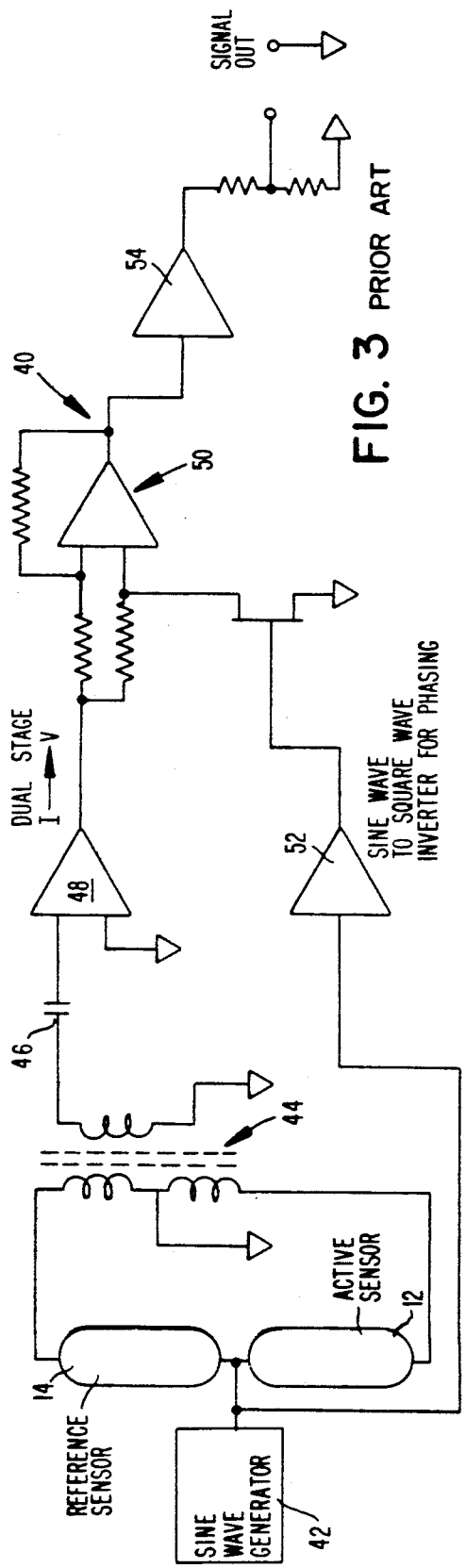
FIG. 3 is a schematic diagram of a prior art differential impedance measuring circuit utilizing an AC bridge configuration.

An example of a differential impedance measuring circuit 40 utilizing an AC bridge configuration is illustrated in FIG. 3. Here again, those elements which are similar to the elements shown in FIGS. 1 and 2 carry like reference numerals. In this circuit 40 the output of a sine wave generator 42 is connected to the common leg between the sensor elements 12 and 14. The sensor elements 12 and 14 are connected to the primary side of a signal transformer 44 having a center tap connected to common. The difference between the current through the active sensor element 12 and the current through the reference sensor element 14 is present in the secondary winding of the transformer 44. One end of the secondary winding of the signal transformer 44 is connected to common while the other end is connected to a capacitor 46. The output of the capacitor 46 is connected to a two-stage active low pass filter 48 which amplifies the signal and converts same from a current signal to a voltage signal. This voltage signal is then rectified by an AC to DC converter, shown generally by the numeral 50. It should be noted that a sine wave to square wave inverter 52 is connected between the output of the sine wave generator 42 and an input to the AC to DC converter 50 to provide phasing to the AC to DC converter 50. The output of the AC to DC converter 50 is connected to an active filter stage 54 to further filter the ripple in the output of the converter 50. This circuit 40 has improved temperature characteristics characteristics over circuits 10 and 30 without the need for temperature compensation, however, it requires additional components which result in significantly higher manufacturing costs and require more printed circuit board space.

Figure 4:
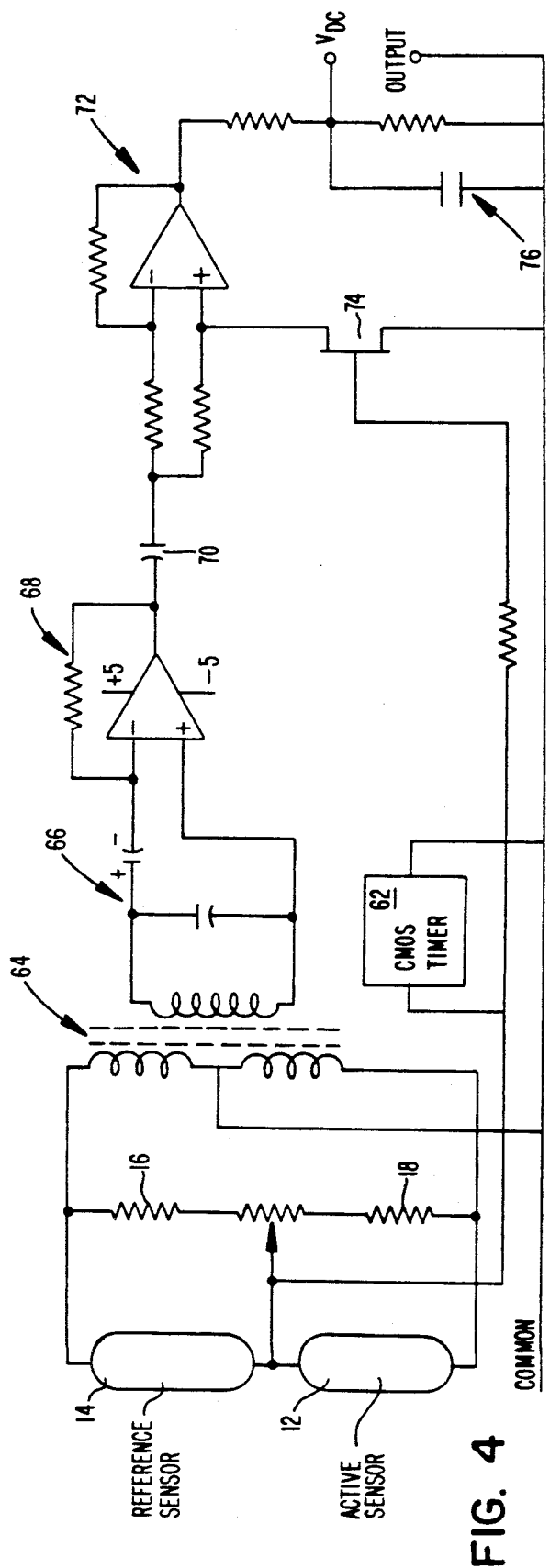
FIG. 4 is a schematic diagram of the present invention.

Referring now to FIG. 4, which is a schematic diagram of the present invention, an improved differential impedance measuring circuit 60 is illustrated. This circuit 60 is similar in some respects to circuit 40 shown in FIG. 3 and those elements which are similar carry the same reference numeral. One of the differences between circuit 60 and circuit 40 is that circuit 60 utilizes a CMOS timer 62 in place of the sine wave generator 42 used in FIG. 3. This CMOS timer 62 produces a unipolar square wave having a magnitude of 0 volts dc to negative 5 volts dc at a frequency of 1 KHz. Since a CMOS timer is used, it can be powered from a negative 5 volt supply which could be a single precision chip that would not increase the current requirements. In this manner, the sensor elements 12 and 14 could also be powered from the same power supply further improving the temperature stability of the circuit 60.

The unipolar square wave produced by the CMOS timer 62 is applied to the common leg between the sensor elements 12 and 14. The sensor elements 12 and 14 are connected to the primary side of a toroidal signal transformer 64 having its center tap connected to common. The primary and secondary windings of the toroidal signal transformer 64 are twisted tightly together and then all of the wires are wound around the core. This twisting and winding process improves the temperature stability of the circuit 60. The secondary winding of the transformer 64 produces a differential bipolar current signal which is representative of the difference between the current in the active sensor element 12 and the reference sensor element 14 and this current signal then passes through a bandpass filter, shown generally by the numeral 66, and is amplified by a single stage amplifier, shown generally by the numeral 68 which also converts the signal to a bipolar AC voltage signal. This bipolar AC voltage signal is then applied to a capacitor 70 whose output is connected to a high pass AC to DC converter, shown generally by the numeral 72. The converter 72 is switched by a field effect transistor 74 connected to the output of the CMOS timer 62 and an input to the converter 72. By using the field effect transistor 74 in conjunction with the negative 5 volt unipolar square wave produced by the CMOS timer 62, the sine wave to square wave inverter 52 required in circuit 40, shown in FIG. 3, is eliminated. In addition, by placing the bandpass filter 66 between the secondary of the signal transformer 64 and the input to the single stage amplifier 68 and by interposing the capacitor 70 between the output of the single stage amplifier 68 and the input to the AC to DC converter 72, the active filter stage 54, shown in FIG. 3, is eliminated. The output signal produced by the AC to DC converter 72 is applied to a low pass passive filter, shown generally by the numeral 76, in order to minimize the ripple in the output signal.

From the foregoing, it is apparent that the improved differential impedance measuring circuit 60 of FIG. 4 has numerous advantages over prior art impedance measuring circuits. For example, this circuit has significantly better temperature stability than the prior art circuits utilizing a DC bridge design, as shown in FIGS. 1 and 2, without the use of means for temperature compensation. When compared to the circuit using an AC bridge design, as shown in FIG. 3, additional advantages are apparent. For example, this circuit 60 does not require a sine wave to square wave converter for phasing the AC to DC converter and also does not require an active filter stage for the resulting signal. Thus, there is a significant decrease in the number of electronic components involved which reduces manufacturing costs, printed circuit board space and increases circuit reliability. In addition, the power upply voltage and power requirements of circuit 60 are less than that of circuit 40. And lastly, circuit 60 has a more desirable transient response to supply spikes as compared to the response produced by circuit 40.

Certain modifications and improvements will occur to those skilled in the art upon reading the foregoing. It should be understood that all such modifications and improvements have been deleted herein for the sake of conciseness and readability, but are properly within the scope of the following claims.

What is claimed is:

1. An improved system for measuring differential impedances comprising:
   means for measuring a parameter representative of a specific operating condition; reference measuring means electrically connected to said parameter measuring means;
   a CMOS timer for producing a square wave and being electrically connected to said parameter measuring means and said reference measuring means;
   transformer means electrically connected to said parameter measuring means and said reference measuring means;

amplifier means electrically connected to said transformer means and signal converter means electrically connected to said amplifier means;

said signal converter means producing an output signal representative of the difference in current passing through said parameter measuring means and said reference measuring means said CMOS timer being electrically connected to said transformer means;

filter means electrically connected to the output of said transformer means and to the input of said amplifier means and switch means electrically connected to said parameter measuring means and said reference measuring means.

2. The system as defined in claim 1 wherein actuation of said switch means causes the actuation of said signal converter means.

3. The system as defined in claim 1 further including capacitance means interposed between said amplifier means and said signal converter means.

4. The system as defined in claim 3, wherein said capacitance means is electrically connected to the output of said amplifier means and to the input of said signal converter means.

* * * * *